United States Patent
Hsing et al.

(10) Patent No.: US 7,975,669 B2
(45) Date of Patent: Jul. 12, 2011

(54) APPARATUS AND METHOD FOR THROTTLE CONTROL OF INTERNAL COMBUSTION ENGINES

(75) Inventors: Pochuan B. Hsing, Sterling Heights, MI (US); Jia-Shiun Chen, Plymouth, MI (US); Kuo-Huey Chen, Troy, MI (US); Yeupin P. Yeh, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/510,506

(22) Filed: Jul. 28, 2009

(65) Prior Publication Data

US 2011/0023823 A1  Feb. 3, 2011

(51) Int. Cl.
*F02D 9/08* (2006.01)
(52) U.S. Cl. .................. 123/337; 123/184.24
(58) Field of Classification Search .......... 123/336,
123/337, 319, 389, 391, 400, 403–405, 184.21,
123/184.24, 184.42, 184.53, 184.56; 251/318–321,
251/333
See application file for complete search history.

(56) References Cited

U.S. PATENT DOCUMENTS

| | | | | | |
|---|---|---|---|---|---|
| 4,805,573 | A | * | 2/1989 | Macfarlane et al. | 123/403 |
| 5,568,749 | A | * | 10/1996 | Liposky | 74/513 |
| 5,662,077 | A | * | 9/1997 | Boswell | 123/184.21 |
| 5,749,342 | A | * | 5/1998 | Chao | 123/184.56 |
| 5,947,085 | A | * | 9/1999 | Deal | 123/389 |
| 6,148,782 | A | * | 11/2000 | Fuesser | 123/184.53 |
| 6,450,141 | B1 | * | 9/2002 | Sakuma | 123/184.57 |
| 7,117,837 | B2 | * | 10/2006 | Bellogi et al. | 123/184.53 |
| 7,341,097 | B2 | * | 3/2008 | Darby | 165/11.1 |
| 2001/0008132 | A1 | * | 7/2001 | Ikeda | 123/400 |
| 2002/0050268 | A1 | * | 5/2002 | Deguchi | 123/336 |
| 2002/0096144 | A1 | * | 7/2002 | Holmes | 123/400 |
| 2006/0219219 | A1 | * | 10/2006 | Fujii et al. | 123/400 |

* cited by examiner

*Primary Examiner* — John T Kwon
*Assistant Examiner* — Johnny H Hoang
(74) *Attorney, Agent, or Firm* — Cantor Colburn LLP

(57) ABSTRACT

A throttle control valve is provided. It includes a valve housing having an inlet end, an outlet end. A valve body located within the housing has a sealing end and a spindle. The sealing end has a teardrop shaped cross-section for cooperating with the valve housing.

20 Claims, 4 Drawing Sheets

APPARATUS AND METHOD FOR THROTTLE CONTROL OF INTERNAL COMBUSTION ENGINES

FIELD OF THE INVENTION

Exemplary embodiments of the present invention are related to throttle a body for an internal combustion engine and, more specifically, to a tear drop valve for a throttle body.

BACKGROUND

Throttle control valves are used in internal combustion engines to regulate air flow. Accurate air flow control is required for stable combustion in the downstream cylinders. Traditional throttle control in an internal combustion engine uses a gate valve design. This produces non-linear and unstable flow, including high turbulence and a high discharge flow loss across the control throttle plate.

A gate valve design in fluid dynamics is well-known to have rough idling control due to its bluff body shape that regulates the passing flow across the bluff body. This shape tends to induce more instability and increase turbulence to the downstream area. Therefore, additional surface features, such as idling control mechanisms, may be needed to modify the orifice pass area for idling control in a gate valve throttle. Past idling control includes preset idle screws and/or solenoid valves with feedback controls in the bypass loops. These extra modifications make throttle body system more complex and also increase manufacturing costs.

SUMMARY OF THE INVENTION

Accordingly, it is desirable to provide a throttle control valve with a teardrop shaped valve body. In the throttle control of an internal combustion engine, the operating span from a closed position to wide-open throttle position is almost linear. Therefore, it is much easier for the engine control module of the engine to regulate the flow accurately. The flow regulating object within the throttle body is the valve body inside the housing. It allows airflow to pass smoothly therethrough, without large disturbances compared to a traditional gate valve throttle. A smooth and accurate flow control will yield stable combustion in the cylinder(s) of the internal combustion engine and generate stable brake torque which in turn reduces noise and vibration issues in an internal combustion engine vehicle.

In an exemplary embodiment of the present invention, a throttle control valve is provided. The throttle control valve includes a valve housing having an inlet end, an outlet end and defining an operating zone therebetween. The valve housing has a direction of flow from the inlet end to the outlet end and the operating zone has an orifice flow area transverse to the direction of flow. A valve body is located within the housing and is capable of movement between a closed position and a wide open throttle position. The valve body has a sealing end and a spindle extending therefrom, the sealing end having a shaped cross-section for cooperating with the operating zone of the valve housing. The orifice flow area of the operating zone varies generally linearly from the closed position to the wide open throttle position.

In another exemplary embodiment of the present invention, a method for providing air flow through a throttle body in an internal combustion engine is provided. The method includes providing a valve housing having an inlet end, an outlet end and regulating air flow through the valve housing from the inlet end to the outlet end which defines a direction of flow, by providing a valve body located within the housing. The housing further includes an operating zone between the inlet end and the outlet end, the operating zone having an orifice flow area transverse to the direction of flow between the valve housing and the valve body. The method includes moving the valve body between a closed position and a wide open throttle position for linearly varying the cross-section area of the operating zone between the closed position and the wide open throttle position.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
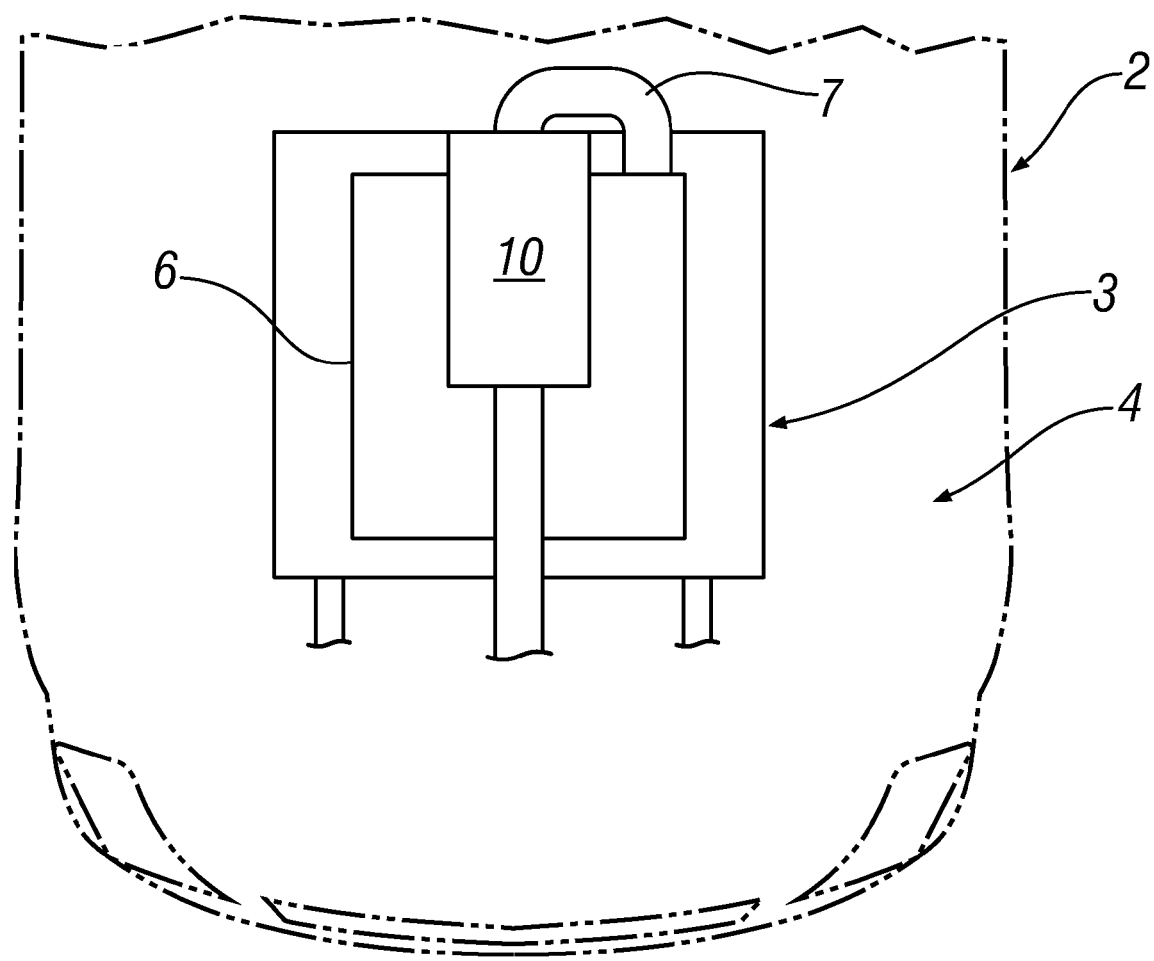
FIG. 1 is a functional block diagram showing the internal combustion engine of the present invention.

Referring now to the Figures, where the invention will be described with reference to specific embodiments, without limiting same, a functional diagram of a vehicle 2 having an internal combustion engine block assembly 3 located within an engine compartment 4 is shown in FIG. 1. An air intake manifold 6, having a gas inlet end 7 is fluidly coupled to a throttle control valve 10 at or near the gas inlet end 7. Air intake manifold 6 generally includes a plurality of gas outlets (not shown) that are fluidly connected to engine block assembly 3. Specifically, air gases are metered through throttle control valve 10 and flow from air intake manifold 6 to the engine block assembly 3.

Figure 2:
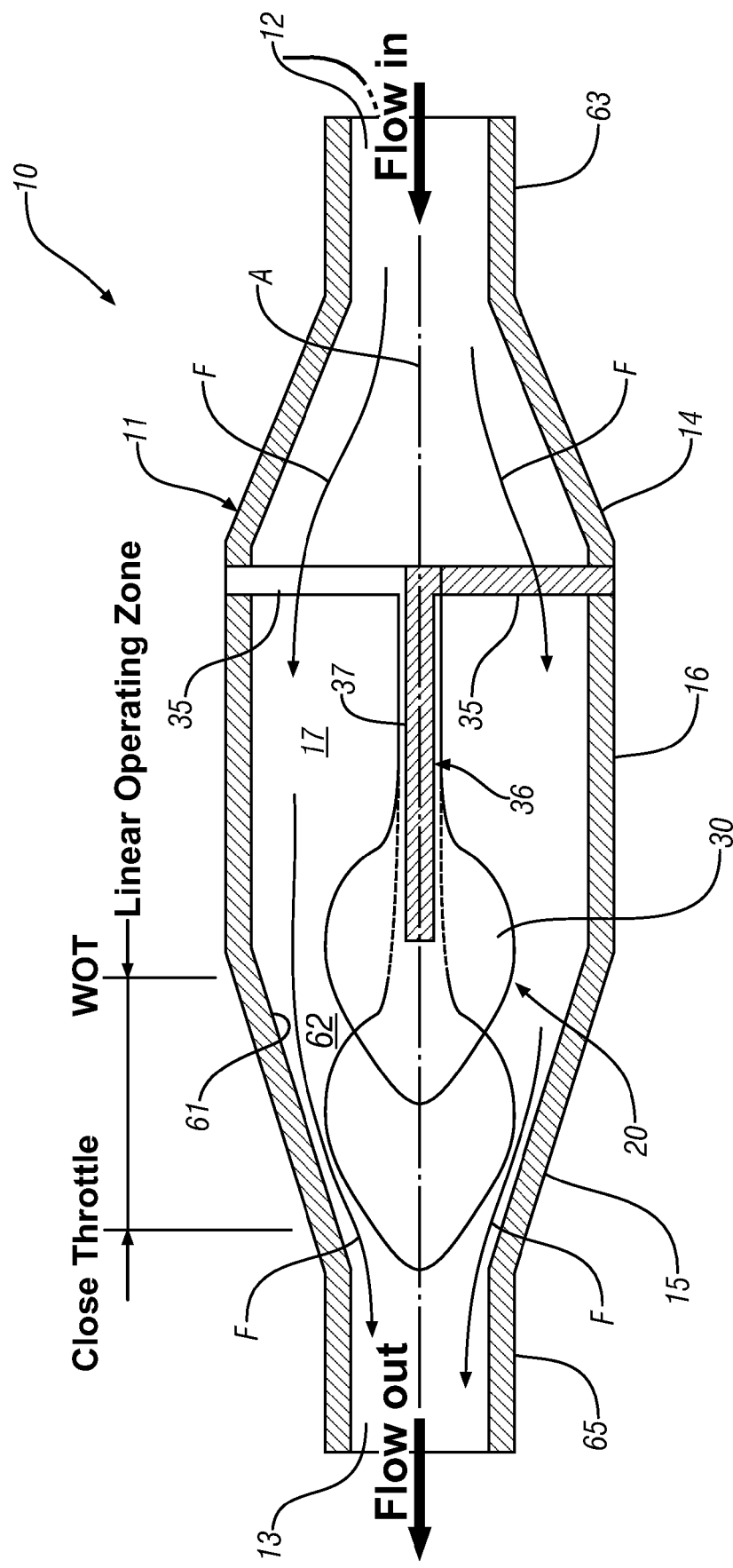
FIG. 2 is an elevation view, in cross-section, of the throttle control valve of the present invention.
Figure 3:
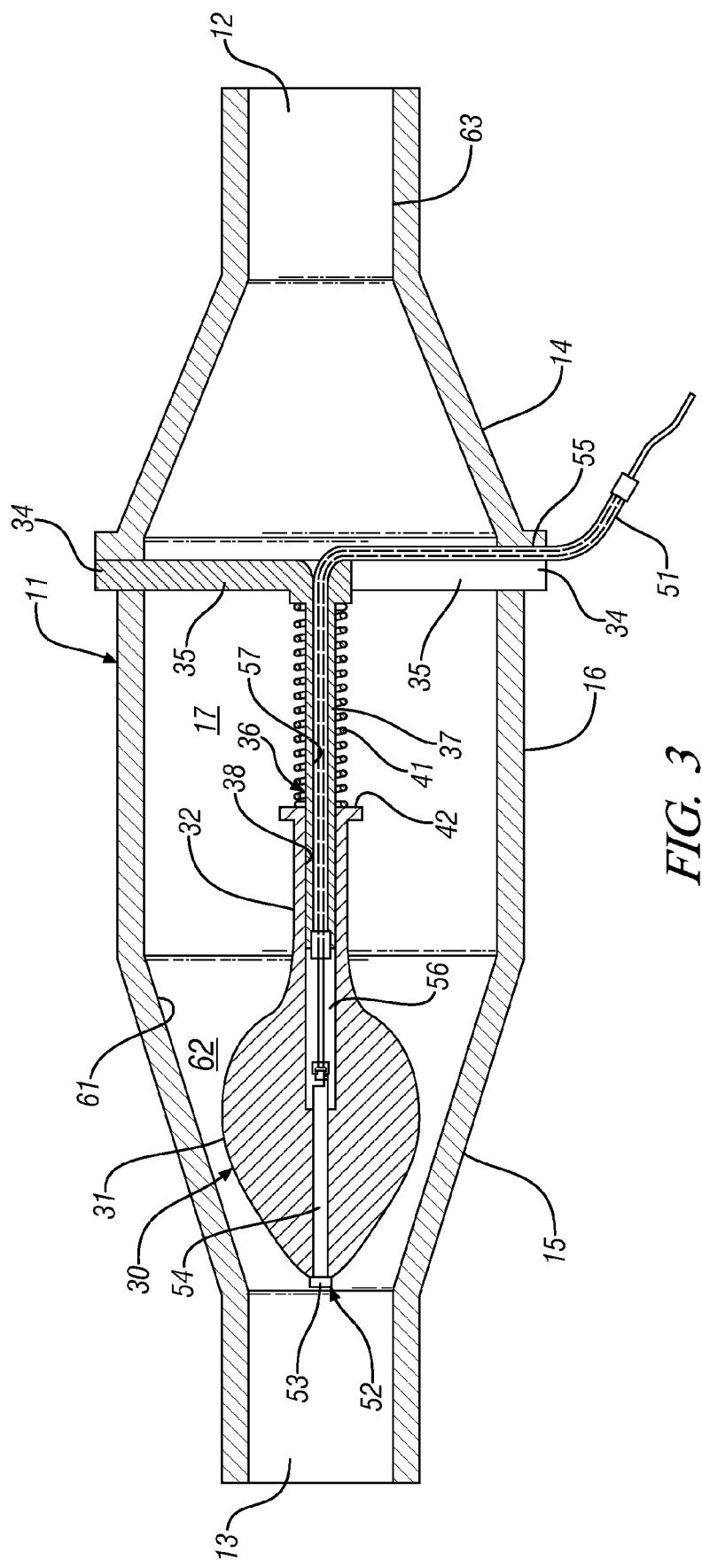
FIG. 3 is a cross-sectional view of the valve body of the present invention.

A cross-section through the throttle control valve 10 of an internal combustion engine 5 is shown in FIGS. 2 and 3. Throttle control valve 10 includes a valve housing 11 having an inlet end 12 and an outlet end 13, with outlet end 13 fluidly connected to gas inlet end 7 of air intake manifold 6. A diverging portion 14 is adjacent inlet end 12 while a converging portion 15 is adjacent outlet end 13. In the exemplary embodiment shown, both first and second diverging portions are frusto-conical in shape. A valve support portion 16 connects diverging and converging portions 14 and 15. In this non-limiting example, the valve support portion 16 is generally cylindrical in shape.

As best seen in FIG. 2, a direction of air flow "F" is shown by the arrows within an interior 17 of valve housing 11. Specifically, diverging portion 14, at the upstream end of valve housing 11 is diverging in the direction of air flow. Conversely, converging portion 15, located at the downstream end of valve housing 11 is converging in the direction of air flow. An operating zone 20 is defined by the housing 11 located within converging portion 15.

Located within valve housing 11 is a valve body 30 which has a sealing end 31 located adjacent outlet end 13 at the downstream end of valve housing 11. A spindle 32 extends upstream from sealing end 31. Valve body 30 is supported by a valve body support 36 extending within valve housing 11. Valve body support 36 is retained therein by a flange 34 interposed between two mating sections of valve housing 11, as shown, the diverging end of diverging portion 14 and the upstream end of valve support portion 16. As can be seen from FIGS. 2 and 3, valve body 30 and specifically sealing end 31 forms a tear drop shaped cross-section for cooperating with converging portion 15. As used herein, tear drop shaped refers to any three dimensional object having a rounded leading edge and a tapered tail. This shape is well known in fluid dynamics as producing less drag due to there being more laminar flow and less turbulent flow in the area of the tear drop shaped object. Other shapes may be substituted for the teardrop shaped valve body 30 shown, such as elliptical, spherical and semi-hemispherical, so long as they are capable of producing quasi-linear flow when used in conjunction with converging portion 15.

In the exemplary embodiment shown, valve support portion 16 includes three transverse supporting arms 35 extending into the interior of valve housing and generally perpendicular to the direction of air flow F. Transverse supporting arms 35 are generally spaced equally about the circumference of flange 34, at about 120 degrees, and intersect in the center of valve housing 11 at an axis A extending therethrough. However, any spacing or number of transverse supporting arms 35 may be used. Depending from the intersection of transverse supporting arms 35, and extending along axis A, is a valve spindle support 36. Valve spindle support 36 has an exterior surface 37 over which an interior surface 38 of valve spindle 32 fits and is adapted to slide thereon.

Fitted over the exterior surface 37 of valve spindle support 36 is a resilient member and in the embodiment shown, a compression spring 41. The upstream end of compression spring 41 bears against transverse supporting arms 35, while the downstream end of compression spring 41 is seated against a flanged end 42 of spindle 32.

A valve control cable 51 is secured at the downstream end of sealing end 31 of valve body 30 by a valve secure adapter 52. Valve secure adapter 52 may take many variant forms, but as shown is a metal ring 53 crimped onto one end 54 of valve control cable 51. Valve control cable 51 extends through cable access 55 and into spindle sleeve 56 defined by the aforementioned interior surface 38. Valve control cable 51 then extends through a cable sleeve 57 extending through valve spindle support 36. Thereafter, valve control cable 51 extends through flange 34 and exterior of valve housing 11 where it is connected to an actuator (not shown).

Throttle control valve 10 will control air flow into an internal combustion engine in conjunction with an acceleration paddle or other valve actuator (not shown). The air flow will mix with a fuel stream to provide a proper air fuel mixture to the internal combustion engine. As shown in FIGS. 2 and 3, throttle control valve 10 is normally closed. When it is desired to allow air to flow through the interior 17 of valve housing 11, the actuator (not shown) draws on valve control cable 51 from outside valve housing 11. The tension placed on valve control cable 51 causes valve body 30, and specifically sealing end 31 to be unseated from its position against an interior surface 61 of converging portion 15 allowing air to flow from inlet end 12 to outlet end 13 through an orifice flow area 62 between the outer surface of sealing end 31 and interior surface 61. Specifically, spindle 32 moves concentrically upstream on valve spindle support 36, with flanged end 42 of spindle 32 compressing compression spring 41 against transverse supporting arms 35.

When the actuator releases tension on valve control cable 51, spring loaded valve spindle 32 causes valve body 30 and sealing end 31 to seat against interior surface 61 of converging portion 15. It will be appreciated that in this manner, the throttle control valve is capable of moving between a closed position when sealing end 31 is fully seated on interior surface 61 and a wide open throttle position, shown in FIG. 2, when valve body 30 is fully retracted upstream by valve control cable 51. In this manner, orifice flow area 62, shown in FIGS. 2 and 3 between closed throttle and wide open throttle in FIG. 2, is a circumferential flow area cross-section about which air flow "F" passes from inlet end 12 to outlet end 13 between sealing end 31 and interior surface 61. The circumferential orifice flow area 62 moves upstream and downstream, transverse to the direction of air flow, with actuation of valve body 30. As stated above, operating zone 20 is the area in converging portion 15 within which movement of valve body 30 occurs, also as shown in FIG. 2.

Figure 4:
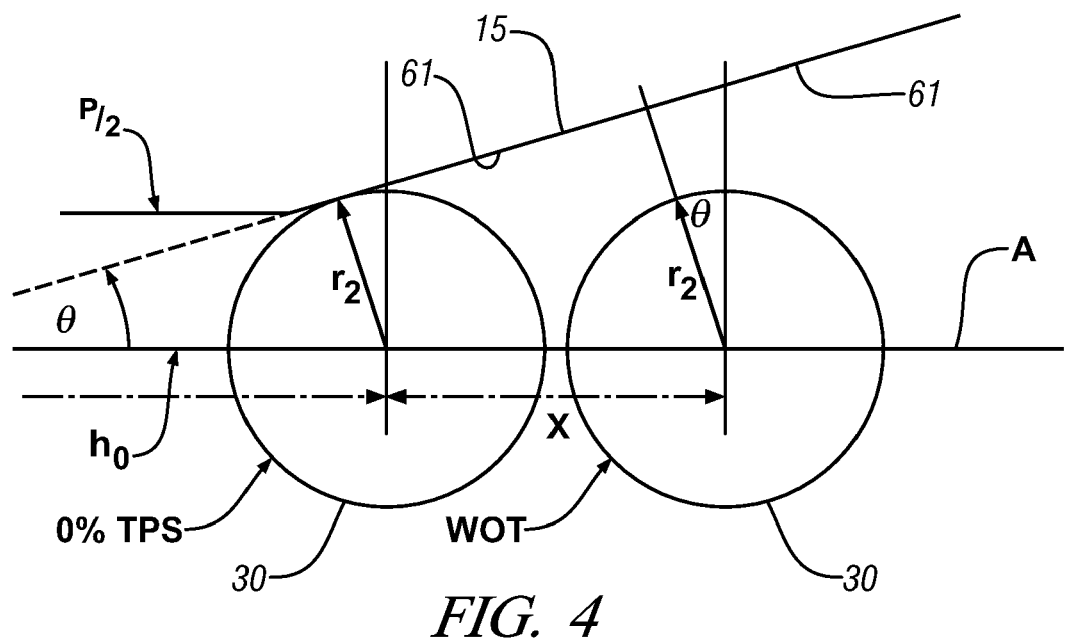
FIG. 4 is a schematic illustration showing one aspect of the present invention.
Figure 5:
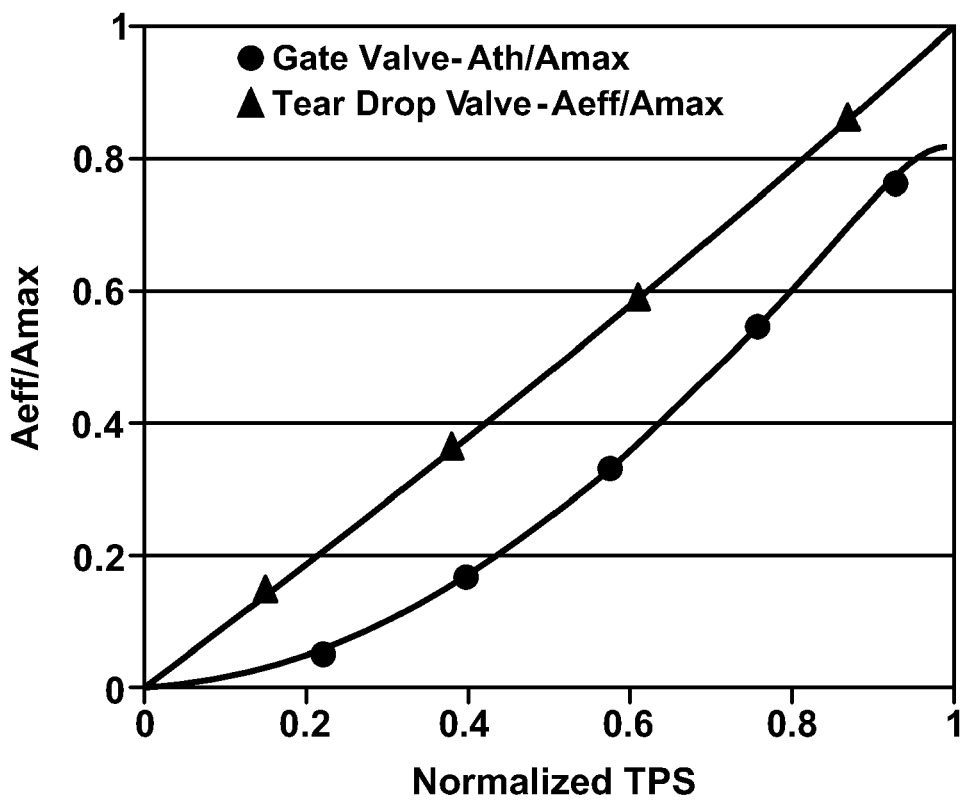
FIG. 5 is a graphical illustration showing another aspect of the present invention.

The orifice flow area 62 is controlled by the position of the tear drop shaped sealing end 31 cooperating with interior surface 61 of converging portion 15, as seen in FIGS. 4 and 5. Importantly, the effective flow area 62 varies generally linearly between the closed position to the wide open throttle position. In an exemplary embodiment utilizing a tear-drop shaped valve body 30 and a frusto-conical converging portion 15, the orifice flow area 62 can be calculated in accordance with Equation 1, below. Obviously, a change in the geometry of valve body 30 and/or converging portion 15, will result in a different equation to calculate the orifice flow area 62:

$$A_{eff} = \pi \cos\theta[((h_0 + x)\sin\theta)^2 - r_2^2] \quad [\text{Eq. 1}]$$

$$= \pi r_2^2 \left( \frac{x}{r_2} \sin 2\theta + \frac{x^2}{h_0^2} \cos\theta \right)$$

$$h_0 = \frac{r_2}{\sin\theta}$$

Where $A_{eff}$ is the orifice flow area 62 x is the throttle position along axis A $r_2$ is an approximation of the radius of the largest sphere of the tear-drop shaped valve body 30

$\theta$ is the angle of converging portion 15 from axis A $h_0$ is the leg of a triangle along axis A to the throttle closed position The proposed tear-drop spindle system has a very small second order term in the functional relationship of the increment of orifice flow area 62 versus the position increment of the tear-drop valve body 30. Therefore, the relationship is almost linear and can be called a quasi-linear design, as shown in FIG. 5.

The flow is shut off completely (in a 0% throttle position "TPS") shown as 0% TPS in FIG. 4, by moving the tear-drop valve body 30 against the interior surface 61. The wide open throttle condition "WOT", or 100% TPS, is met by moving the tear-drop valve body 30 away from the interior surface 61 whereas the orifice flow cross-sectional area 62 is equal to a cross-sectional area P of an original flow pipeline 63, as shown in FIGS. 2 and 3, within which throttle control valve 10 is interposed.

Throttling effect in internal combustion engine applications is achieved by controlling the size of the orifice flow area 62. As shown in FIG. 5, by moving the tear-drop valve body 30 upstream and downstream concentrically against the interior surface 61 of converging portion 15, airflow can be controlled smoothly and almost linearly from 0% to 100% in the invention. In addition, the smoothness of the flow curve results from the tear-drop valve body 30 regulating the air flow F across orifice flow area 62. The result is a quasi-linear effect on the air flow F by the almost linear increment of orifice pass area corresponding to the position increment of the tear-drop valve body 30. This compares with the air flow across a traditional gate valve, shown in FIG. 5, which is much more turbulent and is decidedly non-linear.

As a result, throttle control valve 10 can open faster than a traditional gate valve. This allows more mass air flow through operating zone 20. Tear drop valve body 30 also allows operating zone 20 to reach a choke condition earlier than a traditional gate valve due to a higher mass air flow rate at a similar pressure drop. Additionally, the tear drop cross section valve body 30, and specifically sealing end 31, does not block flow upstream, thus inducing less flow restriction.

While the invention has been described with reference to exemplary embodiments, it will be understood by those skilled in the art that various changes may be made and equivalents maybe substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An internal combustion engine assembly having a valve for regulating airflow comprising:
   an engine block assembly including an air intake manifold;
   a throttle control valve being fluidly coupled to the air intake manifold, the throttle control valve comprising a valve housing having an inlet end, an outlet end and defining an operating zone therebetween, the valve housing having a direction of flow from the inlet end to the outlet end, the operating zone having a cross-sectional area transverse to the direction of flow;
   a valve body located within the housing moveable between a closed position and a wide open throttle position, the valve body having a sealing end and a spindle extending therefrom, the sealing end having a shaped cross-section for cooperating with the operating zone of the valve housing and defining an orifice flow area of the operating zone, the orifice flow area varies generally linearly from the closed position to the wide open throttle position.

2. The internal combustion engine assembly of claim 1, wherein the sealing end has a teardrop shaped cross-section for cooperating with the operating zone of the valve housing.

3. The internal combustion engine assembly of claim 1, including a valve body actuator located outside the operating zone.

4. The internal combustion engine assembly of claim 3, wherein the valve body actuator includes a valve control cable extending from the valve body and through a spindle support portion for actuating the valve body from a closed position to a wide open throttle position.

5. The internal combustion engine assembly of claim 1, wherein the valve housing includes a first frusto-conical portion adjacent the inlet end, a second frusto-conical portion adjacent the outlet end and a valve support portion therebetween.

6. The internal combustion engine assembly of claim 5, wherein the first frusto-conical portion is diverging in the direction of flow and the second frusto-conical section is converging in the direction of flow.

7. The internal combustion engine assembly of claim 6, wherein the valve body support portion is generally cylindrical.

8. The internal combustion engine assembly of claim 1, including a valve body support extending within the valve housing, including a first support portion extending between side walls of the valve housing and a spindle support portion extending between the inlet end and the outlet end, the spindle support portion including a resilient member disposed thereon and seated between the first support portion and the spindle of the valve body.

9. The internal combustion engine assembly of claim 1, wherein the air intake manifold includes a gas inlet end, the gas inlet end adjacent the outlet end of the throttle control valve.

10. A throttle control valve comprising:
    a valve housing having an inlet end, an outlet end and defining an operating zone therebetween, the valve housing having a direction of flow from the inlet end to the outlet end, the operating zone having a cross-sectional area transverse to the direction of flow;
    a valve body located within the housing moveable between a closed position and a wide open throttle position, the valve body having a sealing end and a spindle extending therefrom, the sealing end having a shaped cross-section for cooperating with the operating zone of the valve housing and defining an orifice flow area of the operating zone, the orifice flow area varies generally linearly from the closed position to the wide open throttle position.

11. The throttle control valve of claim 10, wherein the sealing end has a teardrop shaped cross-section for cooperating with the operating zone of the valve housing.

12. The throttle control valve of claim 10, including a valve body actuator located outside the operating zone.

13. The throttle control valve of claim 12, wherein the valve body actuator includes a valve control cable extending from the valve body and through a spindle support portion for actuating the valve body from a closed position to a wide open throttle position.

14. The throttle control valve of claim 10, wherein the valve housing includes a first frusto-conical portion adjacent the inlet end, a second frusto-conical portion adjacent the outlet end and a valve support portion therebetween.

15. The throttle control valve of claim 14, wherein the first frusto-conical portion is diverging in the direction of flow and the second frusto-conical section is converging in the direction of flow.

16. The throttle control valve of claim 15, wherein the valve body support portion is generally cylindrical.

17. A method of providing air flow through a throttle body in an internal combustion engine comprising:
    providing a valve housing having an inlet end, an outlet end;
    regulating air flow through the valve housing from the inlet end to the outlet end defining a direction of flow, by providing a valve body located within the housing, the housing further defining an operating zone therein between the inlet end and the outlet end,
    the operating zone having an orifice flow area transverse to the direction of flow defined between the valve housing and valve body;
    moving the valve body between a closed position and a wide open throttle position for linearly varying the orifice flow area of the operating zone between the closed position and the wide open throttle position.

18. The method of claim 17, wherein linearly varying the orifice flow area includes actuating the valve body in a direction generally parallel to the direction of flow.

19. The method of claim 17, including providing the housing with a converging portion in the operating zone.

20. The method of claim 19, including providing the valve body with a generally teardrop shaped cross-section.

\* \* \* \* \*